Dec. 15, 1964 J. E. CROY 3,161,764

ELECTRONIC MULTIPLIER FOR A VARIABLE FIELD LENGTH COMPUTER

Filed July 25, 1961 2 Sheets-Sheet 1

Dec. 15, 1964 J. E. CROY 3,161,764

ELECTRONIC MULTIPLIER FOR A VARIABLE FIELD LENGTH COMPUTER

Filed July 25, 1961 2 Sheets-Sheet 2

INVENTOR.
JOHN E. CROY
BY Christie, Parker & Hale
ATTORNEYS.

United States Patent Office 3,161,764

Patented Dec. 15, 1964

3,161,764
ELECTRONIC MULTIPLIER FOR A VARIABLE FIELD LENGTH COMPUTER

John E. Croy, East Hills, Roslyn, N.Y., assignor to Burroughs Corporation, Detroit, Mich., a corporation of Michigan Filed July 25, 1961, Ser. No. 126,603
5 Claims. (Cl. 235—160)

This invention relates to an electronic multiplier for an electronic digital computer, and more particularly, is related to a high speed multiplier for use in a computer of the type utilizing operands of variable field lengths.

It is common practice in electronic digital computers to utilize operands of a fixed predetermined number of digits, called a word. The arithmetic units of such fixed field length machines contain registers for storing the operands and the partial product. The size of the registers is fixed since the maximum number of digits in the operands and the partial product are known quantities.

To avoid the limitations imposed by using operands of fixed word lengths, computers have been devised in which the length of the operands can be controlled so that the computer can be caused to perform arithmetic and other operations on numbers of varying lengths. In such machines, known as "variable field length" computers, the operands and partial products can not be contained in the usual registers because the registers are of fixed lengths and any numbers exceeding that length would produce an overflow. To make the registers large enough to accommodate the largest anticipated number of digits that would ever be used in an operand, would be wasteful and costly. In decimal machines, it has heretofore been the practice to leave the operands in storage and to execute the operands character by character, in which case each individual digit location in the main storage is addressable. Such a character by character operation necessitates a large number of memory accesses, which greatly slows down the time required to perform a multiplication for example.

The present invention provides an improved decimal multiplier for a variable field length computer in which the speed of operation is significantly increased by reducing the number of memory access operations necessary in carrying out the multiplication. The multiplier of the present invention may be characterized as using a frame-by-frame multiplication technique. The memory cycle provides access to $N_f$ digits in each frame, where N may be any number greater than one. The larger the number of digits per frame, the fewer the number of frames per operand, and therefore the fewer the number of memory cycles required in performing a frame-by-frame multiplication. However, the larger the number of digits per frame, the larger the registers must be made in the arithmetic unit, and the more costly the machine. In frame-by-frame multiplication, each frame of the multiplicand must be accessed from memory once for each frame of the multiplier. Therefore, the total number of memory cycles to access the operands is equal to the product of the number of multiplicand frames and multiplier frames plus the number of multiplier frames.

In brief, the decimal multiplier of the present invention includes a multiplicand register for storing one frame of the multiplicand and a multiplier register for storing one frame of the multiplier. A sub-accumulator register stores two frames resulting from the multiplication of a single frame of the multiplicand and multiplier. A multiplying circuit produces the product of the frames in the multiplicand and multiplier registers, the product being placed in the sub-accumulator. A multiplicand counter keeps track of the number of frames of the multiplicand that have been accessed from memory to the multiplicand register while a multiplier counter keeps track of the number of frames of the multiplier that have been accessed from memory. A portion of memory is used as an accumulator. After each multiplication of two frames, the least significant frame of digits in the sub-accumulator is stored in the accumulator portion of memory and the most significant frame is added to the next multiplication.

After each frame multiplication cycle, the multiplicand counter is compared with the total number of frames in the multiplicand, and the next multiplicand frame is transferred to the multiplicand register until the comparison shows that all multiplicand frames have been accessed. The multiplier register is then compared with the total number of frames in the multiplier, and the next multiplier frame is transferred to the multiplier register until the comparison shows that all multiplier frames have been accessed, at which time operation is complete. Each time a new multiplier frame is transferred to the multiplier register, two frames of the partial result in the accumulator are transferred to the sub-accumulator to be added to the next frame multiplication.

For a more complete understanding of the invention, reference should be had to the accompanying drawings, wherein.

Figure 1:
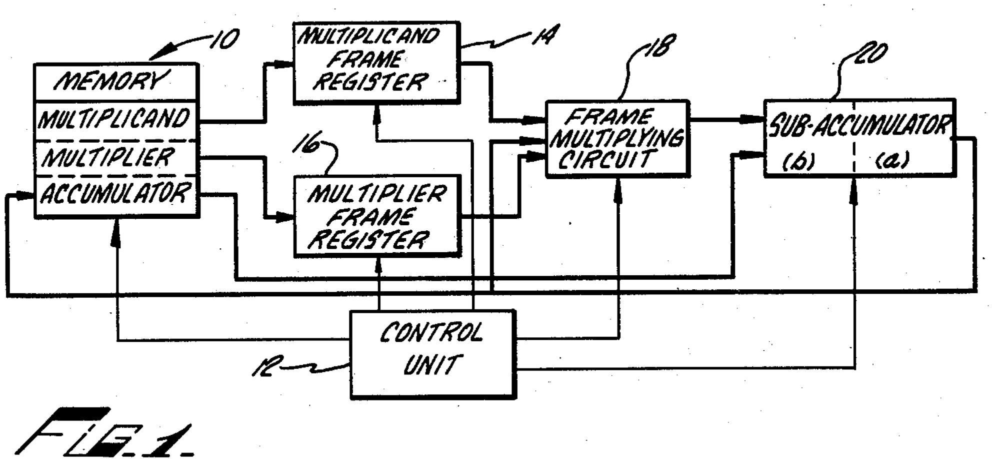
FIGURE 1 is a block diagram of the decimal multiplier system of the present invention.

Referring to FIGURE 1 in detail, the numeral 10 indicates generally a working storage facility, such as a random access core memory. The memory includes storage of the multiplicand having a specified number of frames of a predetermined number of digits or characters per frame, the least significant frame being stored at a base address location and the other frames being stored in successive address locations. In the specific embodiment illustrated, it is assumed that a frame of four demical digits is utilized throughout. Similarly, a multiplier is stored in the memory 10 starting at a known base address and having a known number of frames. A third area is provided in the memory which operates as an accumulator, the base address of the accumulator storage area being known.

Under operation of a control unit 12, one frame of the multiplicand is transferred at a time into a multiplicand frame register 14. Similarly, one frame of the multiplier is transferred to a multiplier frame register 16. Multiplication is effected in response to the control unit 12 by means of a multiplying circuit 18 which is arranged to multiply the contents of the multiplicand frame register by the contents of the multiplier frame register, storing the results in a sub-accumulator register 20. The capacity of the sub-accumulator register 20 is two frames, the least significant frame portion being designated (*a*) and the most significant frame portion being designated (*b*).

The contents of the sub-accumulator 20 can be transferred for storage to the accumulator portion of the memory 10 or can be applied to the frame multiplying circuit 18 to be added to the sums being multiplied. The control unit 12 functions to control each of the circuit elements of the system to generate and store in the accumulator portion of the memory 10 the product of the multiplicand and multiplier stored in the memory 10.

Before studying the multiplying system in detail, consideration should be given to the following example of a numerical solution of a frame-by-frame multiplication.

| #5 | #4 | #3 | #2 | #1 | ←—Frames |
|---|---|---|---|---|---|
| First Multiplier Frame | | 0157 | 1198 | 9700 | Three multiplicand frames. |
| | | | 3015 | 1320 | Two multiplier frames. |
| | | | | 9700 | Bring #1 frame to multiplicand register. |
| | | | | 1320 | Bring #1 frame to multiplier register. |
| | | | $^{b}$1280 | $^{a}$4000 | Multiply and place in subaccumulator register. |
| | | | $^{a}$1280 | | Store (a) in accumulator and shift (b)→(a). |
| | | | 1198 | | Bring #2 frame to multiplicand register. |
| | | | 1320 | | |
| | | $^{b}$0158 | $^{a}$2640 | | Multiply and add to subaccumulator. |
| | | $^{a}$0158 | | | Store (a) in accumulator and shift (b)→(a). |
| | | 0157 | | | |
| | | 0157 | | | Bring #3 frame to multiplicand register. |
| | | 1320 | | | |
| | $^{b}$0020 | $^{a}$7398 | | | Multiply and add to subaccumulator. Store (a) and (b) in accumulator. |
| ↓ | 20 | 7398 | 2640 | 4000 | Contents of accumulator. |
| Second Multiplier Frame | | $^{b}$7398 | $^{a}$2640 | | Bring frames #2 and #3 of accumulator to sub-accumulator. |
| | | | 9700 | | Bring #1 frame to multiplicand register. |
| | | | 3015 | | Bring #2 frame to multiplier register. |
| | (carry) 1 | $^{b}$0322 | $^{a}$8140 | | Multiply and add to subaccumulator. |
| | | $^{a}$0322 | | | Store (a) in accumulator and shift (b)→(a). |
| | $^{b}$0021 | $^{a}$0322 | | | Bring #4 frame of accumulator to sub-accumulator and add carry. |
| | | 1198 | | | Bring #2 frame to multiplicand register. |
| | | 3015 | | | |
| | $^{b}$0382 | $^{a}$2292 | | | Multiply and add to sub-accumulator. |
| | $^{a}$0382 | | | | Store (a) in accumulator and shift (b)→(a). |
| | 0157 | | | | Bring #3 frame to multiplicand register. |
| | 3015 | | | | |
| $^{b}$0429 ↓ | $^{a}$3355 | | | | Multiply and add to sub-accumulator. Store (a) and (b) in accumulator. |
| 429 | 3355 | 2292 | 8140 | 4000 | Contents of accumulator (final result). |

From the study of the above example of frame-by-frame multiplication, it will be seen that the first frame of the multiplier is multiplied with successive frames of the multiplicand starting with the least significant frame. the process is repeated using the second multiplier frame and additional multiplier frames if there be more than two.

It will also be observed that after each frame-by-frame multiplication, the least significant portion of the result in the sub-accumulator is transferred to the accumulator portion of the memory. The most significant frame portion of the sub-accumulator in turn is added to the result produced by the next frame multiplication. After each of the multiplicand frames have been multiplied by the first multiplier frame, both portions of the sub-accumulator are stored in the accumulator and the second multiplier frame is placed in the multiplier register. The first multiplicand frame is again brought up into the multiplicand register. The first frame in the accumulator is not affected during any operation by the second multiplier or subsequent multiplier frames. However, the second and third frames of the accumulator are transferred into the sub-accumulator at the start of the second multiplier frame operation. Thereafter as each multiplicand frame is brought in, the least significant portion of the sub-accumulator is transferred to the accumulator and the next higher frame of the partial result in the accumulator is brought into the sub-accumulator to be added to the next partial product. It should be noted that a partial product may produce a carry, since the addition of a previous partial product to a frame multiplication may produce more than the eight digits carried by the sub-accumulator. This carry is stored and added in during the next frame multiplication. The steps necessary to carry out a frame-by-frame multiplication of any length of multiplicand and multiplier follow the same steps illustrated by the above numerical problem.

Figure 2:
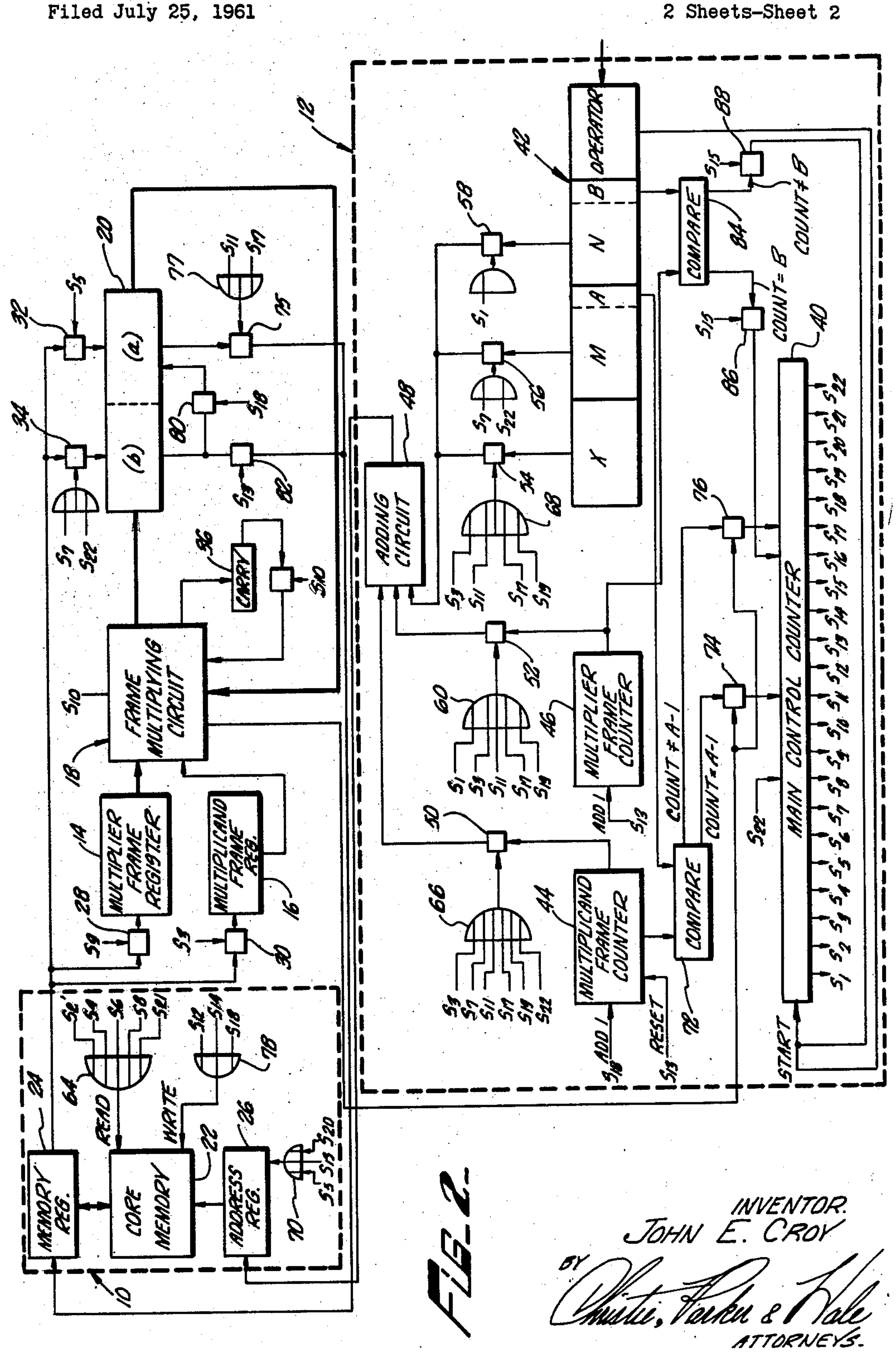
FIGURE 2 is a detailed block diagram of the decimal multiplier system.

Referring to the detailed block diagram of FIGURE 2, the storage 10 includes a core memory 22 having associated therewith an input/output memory register 24 and an address register 26. Core memory circuits of this type are well known. See for example the book "Digital Computer Component Circuits" by R. K. Richards, D. Van Nostrand Company Inc., 1957, chapter 8. A group of digits corresponding to one frame may be transferred from the location designated by the address register 26 in the core memory into the memory register 24 or from the memory register 24 into the designated address location of the core memory 22. In which way information is transferred between the memory register 24 and the core memory 22 is determined by placing a high voltage level on one of two input lines to the core memory 22, designated respectively "Read" and "Write."

The contents of the memory register 24 can be transferred in parallel to the multiplicand frame register 14 by opening a gate 28. Similarly, the contents of the memory register 24 can be transferred to the multiplier frame register 16 by means of a gate 30 or can be transferred either to the least significant portion (*a*) or the most significant portion (*b*) of the sub-accumulator 20 respectively through gates 32 and 34. The registers 14 and 16 each store one frame while the sub-accumulator 20 stores two frames.

The frame multiplying circuit indicated generally at 18 may take any one of a variety of forms well known to the art. A number of decimal multiplication techniques are described in the book "Arithmetic Operations in Digital Computers" by R. K. Richards, D. Van Nostrand Company Inc., 1955, chapter 9. For example, the multiplying means may be of the type in which repated addition of the multiplicand is performed, the number of additions being controlled by a counter set to the digit values of the multiplier. A multiplying circuit of this type is described in Patent No. 2,604,262. The multiplying unit 18 is arranged to generate the product of the frame digits stored in the multiplicand register 14 by the multiplier frame digits stored in the multiplier register 16, the product being stored in the sub-accumulator 20 in binary coded decimal form. At the same time, the previous number stored in the sub-accumulator 20 is added to the product and the carry is stored in a carry toggle 36 if the resulting product and sum is greater than two frames in length.

Operation of the frame-by-frame multiplication system is controlled by the control unit 12 which includes a main control counter 40 having twenty-three high voltage level output states, designated $S_1$ through $S_{23}$. Normally the counter advances sequentially from one state to the next but may be set by external signals to selected states. The central control unit 12 also includes an instruction register 42, the instruction in addition to specifying the multiplication operation, specifies the base address of the accumulator in the core memory 10, the base address being specified as X. The instruction stored in the instruction register 42 also includes the base address of the multiplicand, designated M, as well as the number of frames in the multiplicand, designated A. A third address specifies the base address of the multiplier, and is designated N, as well as the number of frames in the multiplier, designated B. While the invention is described as operating as a three-address machine, the invention is not necessarily limited to operation in a three-address machine.

The central control unit 12 further includes a mutliplicand frame counter 44 and a multiplier frame counter 46 which are used to keep track of the number of the frames transferred respectively to the multiplicand frame register 14 and the multiplier frame register 16.

A three-input adding circuit 48 is used for producing address signals which are translated to the address register 26 of the storage 10. One of the inputs of the adding circuit 48 is coupled to the multiplicand frame counter by means of a gating circuit 50. The second input of the adding circuit 48 is connected to the multiplier frame counter 46 through a gating circuit 52. The third input to the adding circuit 48 is connected to the base address portions X, M, and N of the instruction register 42 respectively through gating circuits 54, 56, and 58.

Figure 3:
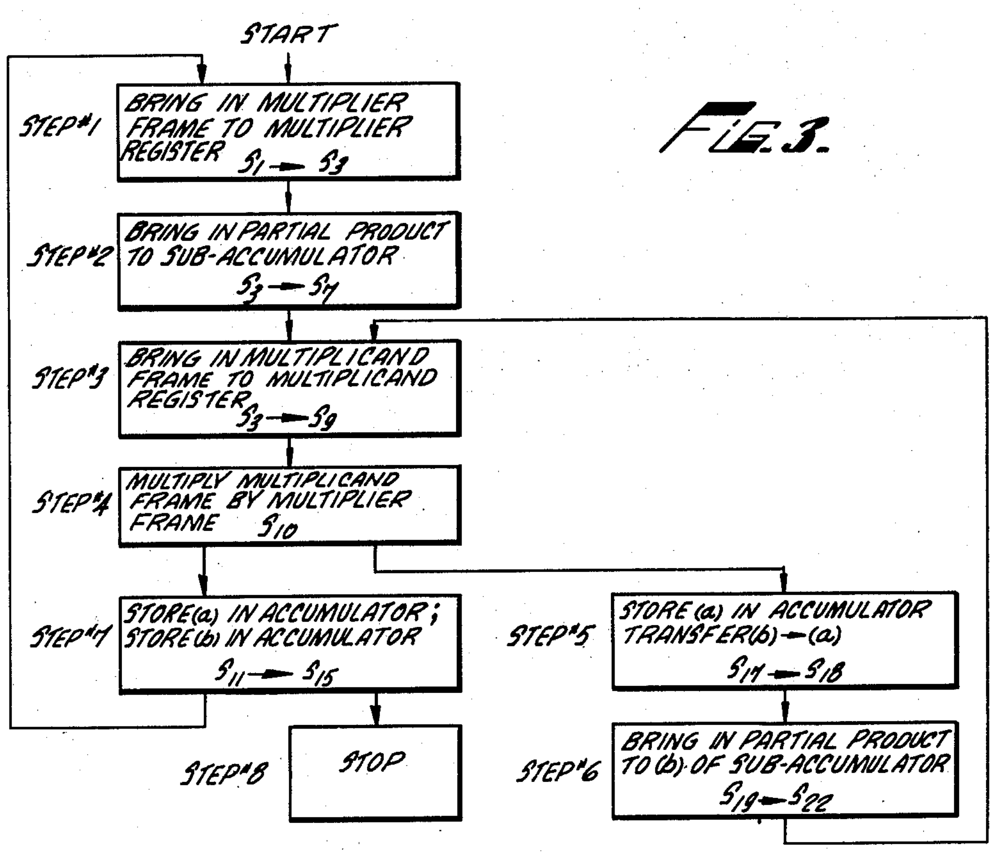
FIGURE 3 is a flow diagram illustrating the various operational steps.

Operation of the multiplication system by the central control unit 12 may be best understood by reference to the numerical example given above as well as by reference to FIGURE 2 and the operational flow chart of FIGURE 3. Assuming that a multiplication instruction has been transferred to the instruction register 42, the operation portion of the instruction provides a start pulse to the main control counter 40 placing it in its $S_1$ state. The main control counter 40 then automatically steps sequentially from state $S_1$ through state $S_{10}$. As shown by the flow diagram of FIGURE 3, the first step is to bring in the multiplier frame from the core memory into the multiplier frame register 16. This is accomplished during states $S_1$ through $S_3$ in the following manner. The $S_1$ state is applied through a logical "or" circuit 60 to the gating circuit 52 to apply the contents of the multiplier frame counter 46 to one input of the adder circuit 48. At the same time, the $S_1$ state is applied to the gating circuit 58 through a logical "or" circuit 62 so that the base address N is applied to the second input of the adding circuit 48. The resulting sum is stored in the address register 26. It should be noted that initially the multiplier frame counter 46 is zero so that during initial operation, the base address N is placed in the address register 26. When the main control counter 40 advances to the $S_2$ state, the multiplier frame is transferred from the specified base address location into the memory register 24. This results from applying the $S_2$ state through a logical "or" circuit 64 to the "Read" input of the core memory 22.

When the main control counter 40 advances to the $S_3$ state, the gating circuit 30 is biased open and the multiplier frame is transferred from the memory register 24 into the multiplier frame register 16.

The next required operation, as set forth in the second step of the flow diagram of FIGURE 3, is to transfer the partial product from the accumulator of the storage facility 10 into the sub-accumulator 20. During the initial operation, since no partial product has yet been formed in the accumulator, this operation only results in zeros being placed in the sub-accumulator 20. This operation becomes significant following subsequent multiplier frame multiplications. The transfer is accomplished during states $S_3$ through $S_7$ of the main control counter in the following manner.

During the $S_3$ state of the main control counter, gating circuit 50 is biased open through a logical "or" circuit 66, applying the multiplicand frame counter contents to one input of the adding circuit 48. At the same time, the gating circuit 52 is biased open by applying the $S_3$ state to the logical "or" circuit 60 to transfer the contents of the multiplier frame counter 46 to the second input of the adding circuit 48. Also the base address X of the accumulator is transferred from the instruction register 42 through the gating circuit 54 to the third input of the adding circuit 48 by biasing open the gating circuit during the $S_3$ state as applied through a logical "or" circuit 68. Initially, since the counters 44 and 46 are both set at zero, the base address X is transferred to the address register 26.

When the main control counter advances to the $S_4$ state, the frame digits in the address location are read into the memory register 24 by applying the $S_4$ state through the logical "or" circuit 64 to the "Read" input of the core memory 22. During the $S_5$ state, the contents of the memory register 24 are transferred to the least significant frame portion ($a$) of the sub-accumulator 20 by biasing open the gating circuit 32. At the same time, the address register 26 is advanced by one to the next address location in the accumulator. The $S_5$ state is applied through a logical "or" circuit 70 to count up the address register 26 by one. The $S_6$ state is applied to the "Read" input of the core memory 22 to transfer the next frame to the memory register 24. The $S_7$ state operates to bias open the gating circuit 34 to load the ($b$) portion of the sub-accumulator 20.

The third operation, as shown in the flow diagram of FIGURE 3, is to bring in the multiplicand frame to the multiplicand register 14. This is accomplished during states $S_7$ through $S_9$ of the main control counter. During the $S_7$ state, the gating circuit 50 is biased open transferring the contents of the multiplicand frame counter 44 to one input of the adding circuit 48. Also the base address M of the multiplicand is transferred through the gating circuit 56 to the other input of the adding circuit 48. Thus the base address, modified by the contents of the multiplicand frame counter, is transferred to the address register 26. During the $S_8$ state, the multiplicand frame is transferred from the address portion in the core memory 22 to the memory register 24 by applying the $S_8$ state to the "Read" input through the logical "or" circuit 64. When the main control counter advances to the $S_9$ state, the gating circuit 28 is biased open transferring the multiplicand frame from the memory register 24 into the multiplicand register 14.

With the multiplicand frame and the multiplier frame stored in the respective registers and the partial product stored in the sub-accumulator, the actual frame multiplication takes place, which is the next step shown in the flow diagram of FIGURE 3. This is accomplished in response to the main control counter advancing to the $S_{10}$ state. As mentioned above, the multiplying unit 18 produces the product of the two frame members and adds the product to the contents of the sub-accumulator 20, storing the result in the sub-accumulator 20. This operation can produce a carry since the addition may produce a one in the ninth digit position of the result. Since the sub-accumulator 20 only stores eight digits, i.e., two four digit frames, the carry toggle 36 is set whenever an overflow is produced by the multiplicaiton operation.

The main control counter 40 remains in the $S_{10}$ state and does not automatically sequence. Instead, the frame multiplying circuit 18 is arranged to generate an output ıulse when the frame multiplication is complete. Before he next operation, however, a determination must be nade whether there is a higher order multiplicand rame to be brought out of memory into the multiplicand egister 14. This is accomplished by making a comparison ›etween the number of multiplicand frames A as stored n the instruction register and the condition of the mul-iplicand frame counter 44. This is made by a conven-ional decimal comparison circuit 72 to which the numbers tored in the multiplicand frame counter 44 and the num-›er A in the instruction counter 42 are applied. Since he multiplicand frame counter is at a value which is ›ne less than the number of multiplicand frames which ıave been transferred to the register 14, e.g., the frame :ounter is zero when the first multiplicand frame has ›een placed in the register 14 and the first multiplication ıas taken place, the comparison is made to determine f A is one greater than the contents of the multiplicand :rame counter 44 or more than one greater than the con-ents of the multiplicand frame counter 44. In the :ormer case, a high level is produced on the output line lesignated Count=$A-1$ in FIGURE 2. In the latter :ase, a high level is placed on the line designated Count≠$A-1$. These output lines from the comparison :ircuit 72 are respectively applied to a gating circuit 74 ınd a gating circuit 76. At the end of the multiplication ›peration, the output pulse from the frame multiplying :ircuit 18 is applied to both the gating circuits 74 and 76. Depending upon which of the gating circuits is biased ›pen by the comparison circuit 72, this pulse sets the nain control counter either to the $S_{11}$ state or the $S_{17}$ state.

Assuming the multiplicand frame counter is at a value ess than $A-1$, the gating circuit 76 is biased open by the :omparison circuit 72 and the main control counter is set to the $S_{17}$ state. This means that the next highest ›rder multiplicand frame must be brought into the reg-ster 14. However, before the next frame multiplication :an take place, as is evident from the numerical example given above and the fifth step of the flow diagram of FIGURE 3 the least significant frame (*a*) of the sub-ıccumulator 20 must be placed in the accumulator sec-ion of the core memory 22 and the most significant :rame (*b*) of the sub-accumulator 20 transferred to the east significant frame. During the sixth step, one frame of the partial product stored in the accumulator must hen be transferred to the highest order portion (*b*) of the sub-accumulator 20.

To this end, during the $S_{17}$ state, the base address X is transferred through the gating circiut 54 to one input of the adding circuit 48. Also the contents of the mul-tiplicand frame counter 44 are applied through the gating circuit 50 to one input of the adding circuit 48 and the contents of the multiplier frame counter 46 are trans-ferred to another input of the adding circuit 48 through the gating circuit 52. The resulting sum is placed in the address register 26. During the $S_{17}$ state, the contents of the least significant portion (*a*) of the sub-accumulator 20 are transferred to the memory register 24 through a gating circuit 75, biased open by the $S_{17}$ state applied through a logical "or" circuit 77.

During the $S_{18}$ state, applied to the "Write" input of the core memory 22 through a logical "or" circuit 78, the contents of the memory register 24 are transferred to the accumulator section of the core memory 22. Also the $S_{18}$ state is applied to the multiplicand frame counter 44 to add one to the state of the counter. During the $S_{18}$ state, the contents of the most significant portion (*b*) of the sub-accumulator 20 are transferred, by biasing open the gating circuit 80, to the least significant portion (*a*) of the sub-accumulator 20.

During the sixth stage of operation as shown by the flow diagram of FIGURE 3, the base address X is transferred to the adding circuit through the gating circiut 54 during the $S_{19}$ state. Also the contents of the multiplicand frame counter 44 and the contents of the multiplier frame counter 46 are applied to the adding circuit 48 to produce a new modified address in the address register 26. During the $S_{20}$ state, this address is increased by one by applying the $S_{20}$ state to the logical "or" circuit 70, actuating the add one input of the address register 26.

During the $S_{21}$ state of the main control counter 40, a high level is applied through the logical "or" circuit 64 to the "Read" input of the core memory 22 trans-ferring a frame from the partial product stored in the accumulator into the memory register 24. When the main control counter advances to the $S_{22}$ state, the con-tents of the memory register 24 are transferred through the gating circuit 34 to the most significant portion (*b*) of the sub-accumulator 20. At the same time, the con-tents of the multiplicand frame counter 44 are added to the base address M of the multiplicand through the adding circuit 48 by biasing open the gating circuits 50 and 56 during the $S_{22}$ state, the result being stored in the address register 26. At the termination of the $S_{22}$ state, the main control counter is automatically set back to the $S_8$ state.

As shown by the flow diagram of FIGURE 3, the cycle is repeated in which the next multiplicand frame is placed in the multiplicand register 14 and a frame mul-tiplying operation takes place. This cycle of operation is repeated until the comparison circuit 72 senses that all of the multiplicand frames have been brought out of the multiplicand portion of the core memory 22. When this occurs, the comparison circuit 72 biases open the gating circuit 74 so that at the end of the multiplying operation, the main control counter is set to the $S_{11}$ state instead of the $S_{17}$ state.

Before the next multiplier frame is brought into the multiplier register 16, and the above process repeated, as shown by the seventh step of the flow diagram of FIGURE 3, the contents of the sub-accumulator 20 must be transferred to the accumulator in the core memory 22. To this end, during the $S_{11}$ state of the main control counter 40, an address is generated by adding the contents of the multiplicand frame counter 44 and the multiplier frame counter 46 to the base address X. This is ac-complished by biasing open the gating circuits 50, 52, and 54 during the $S_{11}$ state. The contents of the least significant portion (*a*) of the sub-accumulator 20 are transferred by the gating circuit 75 to the memory reg-ister 24, the $S_{11}$ state being applied through the logical "or" circuit 77 to the gating circuit 75. The $S_{12}$ state is applied through the logical "or" circuit 78 to the "Write" input of the core memory 22 causing the contents of the memory register 24 to be stored in the accumulator section of the code memory 22.

During the $S_{13}$ state, the address register 26 is advanced by one by applying the $S_{13}$ state through the logical "or" circuit 70 to the address register 26. At the same time, the contents of the most significant portion (*b*) of the sub-accumulator 20 are transferred through a gating cir-cuit 82 to the memory register 24. Also during the $S_{13}$ state, the multiplicand frame counter 44 is reset to zero and the multiplier frame counter 46 is advanced by one. When the main control counter 40 advances to the $S_{14}$ state, the contents of the memory register 24 are trans-ferred to the accumulator section of the core memory 22, the $S_{14}$ state being applied to the "Write" input of the core memory 22 through the logical "or" circuit 78. At this point, a comparison is made between the contents of the multiplier frame counter 46 and the number of multiplier frames B as stored in the instruction register 42. The comparison is made by a conventional decimal comparison circuit 84 which energizes one of two out-put lines designated Count=$B$ and Count≠$B$. The for-mer condition indicates that all the multiplier frames have been brought out of memory and the operation is complete. The main control counter 40 is set to the $S_{16}$ state in this event by means of a gating circuit 86.

However, in the event the comparison circuit 84 shows that the count is not equal to B, a gating circuit 88, during the $S_{15}$ state, passes the signal from the comparison circuit 84 to the START of the main control counter 40, returning it to the $S_1$ state, starting the whole operation described above over again.

From the above description, it will be recognized that the circuit of FIGURE 2 operates to perform a frame-by-frame multiplication as exemplified by the numerical example given above. When the main control counter 40 is finally set to the $S_{16}$ state, indicating an end of the multiplication operation, the full product of the multiplicand multiplier is stored in the accumulator section of the storage facility 10. By operating with frames of a fixed number of digits, the registers required in the arithmetic unit are all fixed in length. Yet the multiplication scheme described permits the multiplicand, multiplier, and product to assume any length desired within the capacity of the storage facility 10. The circuit can operate with parallel operation throughout, making it extremely fast. The number of memory accesses is greatly reduced over a character by character multiplication scheme such as heretofore used in variable field length computers.

What is claimed is:

1. Apparatus for multiplying two decimal numbers of variable digit length utilizing a storage facility in which numbers are stored in binary coded form in groups of fixed decimal digit length greater than one, said apparatus comprising an arithmetic unit arranged to receive two groups of binary coded decimal digits of said fixed length and generate the product, temporary storage means for storing two groups of digits comprising the product as it is generated, the product consisting of a high order group of decimal digits of said fixed length and a low order group of decimal digits of said fixed length, first transfer means for transferring groups of digits comprising a multiplicand in sequence starting with the lowest order group from the storage facility to the arithmetic unit, second transfer means for transferring groups of digits comprising a multiplier in sequence starting with the lowest order group from the storage facility to the arithmetic unit, control means for operating the first and second transfer means to transfer all the groups of digits comprising the multiplicand to the arithmetic unit for each group of the multiplier transferred to the arithmetic unit, whereby each digit group of the multiplicand is multiplied with each digit group of the multiplier in succession, means for sensing the transfer of the highest order multiplicand groups to the multiplying means, means actuated by said sensing means for transferring both the high order and low order groups of digits in the temporary storage means to the storage facility, means for counting the number of multiplier digit groups transferred to the multiplying means and sensing if the highest multiplier order has been transferred to the multiplying means, means responsive to the multiplier group counting and sensing means and the highest order multiplicand group sensing means for selectively transferring a pair of said digit groups from the storage facility to the temporary storage means after the highest order multiplicand group is sensed and the highest order multiplier has not been sensed, said last-named transferring means including means controlled by said counting means for selecting the digit groups in the storage facility that are the next two higher orders of digit groups in the stored product than the order of the last multiplier groups transferred to the multiplying means as identified by said counting means, and means for adding the highest order group of digits in the temporary storage means to the next product generated by the multiplying means.

2. Multiplier apparatus for multiplying two decimal numbers of variable digit lengths comprising an addressable storage unit for storing the multiplicand, the multiplier, and the product, means for transferring frames of a fixed number of binary coded decimal digits into and out of the storage unit in response to coded address signals, a multiplier frame register for storing one frame of decimal digits of the multiplier at a time, a multiplicand frame register for storing one frame of decimal digits of the multiplicand at a time, a sub-accumulator register for storing two frames of decimal digits of a partial product at a time, means for generating binary coded signals in the sub-accumulator register corresponding to the decimal product of the frame digits stored in the multiplicand and multiplier frame registers, a multiplicand frame counter, a multiplier frame counter, means for storing signals representing the base address of the product storage location in the storage unit, means for storing signals representing the base address and number of frames of the multiplicand in the storage unit, means for storing signals representing the base address and number of frames of the multiplier in the storage unit, means for comparing the contents of the multiplicand frame counter with the signals representing the total number of frames of the multiplicand, means for comparing the contents of the multiplier frame counter with the signals representing the total number of frames of the multiplier; adding means; first control means including means for transferring the contents of the multiplier frame counter and the signals from said means for storing signals representing the base address of the multiplier to the adder means to produce a storage address signal, means for actuating said transferring means in response to the storage address signal, and means for coupling the addressed output of the storage means to the multiplier frame register; second control means including means for transferring the contents of the multiplier frame counter, the multiplicand frame counter, and the signals from said means for storing signals representing the base address of the product to the adder means to produce a storage address signal, means for actuating said transferring means in response to the storage address signal, means for coupling the addressed output of the storage means to the sub-accumulator register and advancing the address signal by one, and means for coupling the resulting addressed output of the storage means to the sub-accumulator; third control means including means for applying the contents of the multiplicand frame counter and the signals from said means for storing signals representing the base address of the multiplicand to the adder means to produce a storage address signal, means for actuating said transferring means in response to the storage address signal, and means for coupling the addressed output of the storage means to the multiplicand register; fourth control means including means for coupling the contents of the multiplicand and multiplier frame counters and the base address signal from said base address storing means to the adder means to produce an address signal, means for actuating said storage transferring means in response to the storage address signal, means for coupling the least significant frame of digits in the sub-accumulator to the addressed location of the storage means, means for transferring the most significant frame of digits in the sub-accumulator to the least significant frame position, and means for advancing the multiplicand frame counter by one; fifth control means including means for coupling the contents of the multiplicand and multiplier frame counters and the base address signals from the product base address storing means to the adder means and increasing the output of the adder by one to produce an address signal, means for actuating the transferring means in response to the address signal, and means for coupling the output to the most significant frame portion of the sub-accumulator, and means for automatically actuating the third control means; and sixth control means for applying the multiplicand and multiplier frame counters and the base address signals from the product base address storing means to the adder means to produce a storage address signal, means for actuating the transferring means in response to the address signal to transfer the least significant frame of the sub-accumulator to the storage unit, means for advancing the address signal by one, means for actuating the transferring means in response to the modified address signal to transfer the most significant frame of the sub-accumulator to the storage unit, and means for increasing the multiplier frame counter by one; and sequential control means for sequentially operating the first, second, and third control means and the frame multiplier means, the sequential control means in response to the multiplicand frame counter comparing means actuating the fourth and fifth control means if less than all the multiplicand frames have been counted or the sixth control if all the multiplicand frames have been counted, and the sequential control means, in response to the multiplier frame counter, further actuating the first control means and repeating the sequential operation if less than all the multiplier frames have been counted.

3. A decimal multiplying apparatus comprising means for storing a multiplicand of any number of decimal digits in electrically coded form, means for storing a multiplier in electrically coded form, means for multiplying together two groups of a fixed number greater than one of decimal digits applied to the multiplying means in electrically coded form, an accumulator register coupled to the output of the multiplying means for storing in electrically coded form decimal digits equal in number to the sum of the number of digits in said two groups to provide a storage for a higher order group of digits and a lower order group of digits forming the product of said two groups, the multiplying means including means for adding the result of a multiplication to the existing contents of the accumulator register, product storing means for storing an indefinite number of groups of decimal digits in electrically coded form, means for transferring groups of decimal digits from the multiplicand storing means to the multiplying means in sequence starting with the least significant groups of digits, means for transferring groups of decimal digits from the multiplier storing means to the multiplying means in sequence starting with the least significant group of digits, all groups of multiplicand digits being applied to the multiplying means once for each group of multiplier digits, means for transferring the lower order group of digits in the accumulator means to the product storing means following each multiplication operation by the multiplying means and transferring the higher order group of digits to the lower order position of the accumulator means, means including a first counter for sensing transfer of the highest order group of the multiplicand to the multiplying means, means responsive to said sensing means for transferring both groups of digits in the accumulator means to the product storing means after the highest order group of digits of the multiplicand has been applied to the multiplying means, means including a second counter for sensing transfer of the highest order group of the multiplier to the multiplying means, and means responsive to said last-named sensing means for loading the accumulator means with two of said groups of decimal digits from the product storing means each time a new multiplier digit group is applied to the multiplying means.

4. In a digital computer having a storage facility in which binary coded decimal digits are stored in frames of a fixed number of decimal digits in addressable locations, apparatus for multiplying a multiplicand and multiplier of any number of decimal digits in length where the multiplicand and multiplier are stored in successive addressable frames in the facility starting at specified base address locations for the lowest order frames and the product is stored in the facility starting at a specified base address location for the lowest order frame, the apparatus comprising a multiplicand frame register for storing one frame of the multiplicand, a multiplier frame register for storing one frame of the multiplier, an accumulator register for storing two frames of a partial product, means coupled to the multiplicand, multiplier, and accumulator registers for generating the decimal product of the digit frames stored in the multiplicand and multiplier frame registers and adding the result to the contents of the accumulator register, means including a first counter for transferring the multiplicand frames in sequence starting with the base address from the storage facility to the multiplicand frame register, the counter being advanced with the transfer of each frame, means including a second counter for transferring the multiplier frames in sequence starting with the base address from the storage facility to the multiplier frame register, means responsive to the first counter for initiating transfer of a new multiplier frame and advancing the second counter after each complete sequence of multiplicand frames has been transferred, the product generating means being actuated after transfer of each multiplicand frame, whereby each multiplicand frame is multiplied once by each multiplier frame, first control means including an adder generating an address determined by the sum of the base address and the contents of the first and second counters for transferring the least significant frame of the accumulator means to the resulting address location in the storage facility following each operation of the product generating means, transfering the most significant frame to the least significant frame portion of the accumulator means, increasing said address by two, and transferring the contents of the resulting address location in the storage facility to the most significant frame portion of the accumulator means, means responsive to the first counter for modifying said address by one and transferring the highest order frame from the accumulator means to the resulting address location in the storage facility following the operation of the product generating means on the highest order multiplicand frame, and second control means including said adder for generating an address determined by the sum of the base address and the contents of the first and second counters for transferring the frame from the resulting address location to the least significant portion of the accumulator means, increasing the address by one, and transferring the frame from the resulting address location to the most significant portion of the accumulator.

5. Apparatus for generating the product of two decimal numbers having an indefinite number of digits stored in electrically coded form and storing the product in electrically coded form comprising means for generating signals representing the product of first and second input numbers each having a fixed number of decimal digits greater than one in electrically coded form, means for applying binary coded signals representing groups of said fixed number of decimal digits of the first of said numbers in sequence to one input of the product generating means starting with the least significant group of digits, means for applying binary coded signals representing groups of said fixed number of decimal digits of the second of said numbers in sequence to the other input of the product generating means starting with the least significant group, means controlling each of said signal applying means to apply a first group of decimal digits of one number to the product generating means repeatedly together with all of the groups of decimal digits in succession of the other number for generating a partial product, control means for thereafter applying each of the remaining groups of decimal digits to the product generating means together with all of the groups of decimal digits in succession of the other number for generating additional partial products, accumulating means for storing the partial products, means adding all the decimal digits of each partial product as generated to the next higher order groups of digits in the accumulating means, and means selecting two of said groups of decimal digits from the accumulating means during the generation of each partial product and summing them with the next partial product, said selecting means including counting means for selecting the next higher order groups of digits each time.

References Cited in the file of this patent

UNITED STATES PATENTS

| | | |
|---|---|---|
| 2,873,913 | Hebel | Feb. 17, 1959 |
| 2,981,470 | Richards et al. | Apr. 25, 1961 |
| 3,001,708 | Glaser et al. | Sept. 26, 1961 |
| 3,053,449 | Hoberg et al. | Sept. 11, 1962 |